United States Patent
Wang et al.

(10) Patent No.: US 11,620,237 B2
(45) Date of Patent: *Apr. 4, 2023

(54) FLOW TABLE AGING OPTIMIZED FOR DRAM ACCESS

(71) Applicant: Google LLC, Mountain View, CA (US)

(72) Inventors: Weihuang Wang, Los Gatos, CA (US); Prashant Chandra, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,645

(22) Filed: Oct. 25, 2021

(65) Prior Publication Data

US 2022/0043756 A1    Feb. 10, 2022

Related U.S. Application Data

(63) Continuation of application No. 16/549,695, filed on Aug. 23, 2019, now Pat. No. 11,169,932.

(Continued)

(51) Int. Cl.
*H04L 12/873* (2013.01)
*G06F 12/123* (2016.01)
(Continued)

(52) U.S. Cl.
CPC ........ *G06F 12/123* (2013.01); *G06F 12/0246* (2013.01); *H04L 47/10* (2013.01);
(Continued)

(58) Field of Classification Search
CPC .............. G06F 12/123; G06F 12/0246; G06F 12/0875; H04L 47/10; H04L 47/2483;
(Continued)

(56) References Cited

U.S. PATENT DOCUMENTS 7,633,944 B1 * 12/2009 Chang ................. H04L 63/0263
710/62
7,747,737 B1 * 6/2010 Apte ....................... H04L 45/38
709/224

(Continued)

FOREIGN PATENT DOCUMENTS

CN    105282037 A    1/2016
CN    108337172 A    7/2018

OTHER PUBLICATIONS

International Preliminary Report on Patentability for International Application No. PCT/US2019/060203 dated Dec. 2, 2021. 10 pages.

(Continued)

*Primary Examiner* — Wutchung Chu
(74) *Attorney, Agent, or Firm* — Lerner, David, Littenberg, Krumholz & Mentlik, LLP

(57) ABSTRACT

A flow table management system can include a hardware memory module communicatively coupled to a network interface card. The hardware memory module is configured to store a flow table including a plurality of network flow entries. The network interface card further includes a flow table age cache configured to store a set of recently active network flows and a flow table management module configured to manage a duration for which respective network flow entries in the flow table stored in the hardware memory module remain in the flow table using the flow table age cache. In some implementations, age information about each respective flow in the flow table is stored in the hardware memory module in an age state table that is separate from the flow table.

18 Claims, 4 Drawing Sheets

Related U.S. Application Data

(60) Provisional application No. 62/849,594, filed on May 17, 2019.

(51) Int. Cl.
*G06F 12/02* (2006.01)
*H04L 47/52* (2022.01)
*H04L 47/2483* (2022.01)
*H04L 49/90* (2022.01)
*H04L 47/10* (2022.01)

(52) U.S. Cl.
CPC ........ *H04L 47/2483* (2013.01); *H04L 47/522* (2013.01); *H04L 49/9068* (2013.01)

(58) Field of Classification Search
CPC ... H04L 47/522; H04L 49/9068; H04L 45/54; H04L 45/38; Y02D 10/00
See application file for complete search history.

(56) References Cited

U.S. PATENT DOCUMENTS

| | | | |
|---|---|---|---|
| 7,817,549 B1 | 10/2010 | Kasralikar et al. | |
| 9,065,724 B2 | 6/2015 | Kohn et al. | |
| 9,244,843 B1* | 1/2016 | Michels | G06F 12/126 |
| 2005/0276230 A1* | 12/2005 | Akahane | H04L 43/00 |
| | | | 370/252 |
| 2011/0249673 A1 | 10/2011 | Loon et al. | |
| 2013/0262703 A1* | 10/2013 | Dong | H04L 47/38 |
| | | | 709/247 |
| 2014/0369348 A1* | 12/2014 | Zhang | H04L 45/023 |
| | | | 370/389 |
| 2015/0081833 A1* | 3/2015 | Pettit | H04L 45/54 |
| | | | 709/213 |
| 2015/0169451 A1* | 6/2015 | Jackson | G06F 12/0895 |
| | | | 711/135 |
| 2016/0149819 A1 | 5/2016 | Hussain et al. | |
| 2016/0373364 A1* | 12/2016 | Yokota | H04L 47/2483 |
| 2018/0300244 A1 | 10/2018 | Jackson | |
| 2020/0076928 A1* | 3/2020 | Wang | H04L 45/42 |

OTHER PUBLICATIONS

Anonymous: "Flow Handling Juniper/contrail-controller Wiki GitHub." Feb. 23, 2016 (Feb. 23, 2016), XP855668422, Retrieved from the Internet: <https://github.com/Juniper/contrail-controller/wiki/Flow-Handling>. [retrieved on Feb. 13, 2020]. 3 pages.

International Search Report and Written Opinion for International Application No. PCT/US2019/060203 dated Feb. 21, 2020. 18 pages.

Vrouter Module Parameters. Sep. 12, 2017. Retrieved from the Internet: <https://github.com/Juniper/contrail-controller/wiki/Vrouter-Module-Parameters>. 4 pages.

Office Action for Chinese Patent Application No. 201980098495.7 dated Sep. 2, 2022. 9 pages.

Guo et al. Two-stage storage flow tracking system based on service identification system architecture. Nov. 2013. Computer Engineering and Design, vol. 34, No. 11, pp. 3780-3784. English translation of abstract only.

Zhu et al. Scalable Flow Table Entries Processing Mechanism in Software-defined Networks. Dec. 2016. Computer Technology and Development, vol. 26, No. 12, pp. 12-16. English translation of abstract only.

* cited by examiner

FLOW TABLE AGING OPTIMIZED FOR DRAM ACCESS

RELATED APPLICATIONS

The present application is a continuation of U.S. patent application Ser. No. 16/549,695, filed Aug. 23, 2019, which claims priority to U.S. Provisional Patent Application No. 62/849,594, filed on May 17, 2019, all of which are incorporated herein by reference.

BACKGROUND

A hardware component, such as a network interface card (NIC), a network router, a switch, or server, can have access to a flow table for storing instructions with respect to the processing of network traffic. Network traffic is usually processed on a per network flow basis. As a data packet associated with a flow comes into a network component, the network component can look up the flow in the flow table or a flow table cache to determine how to process the incoming data packet. If the flow is stored in the flow table cache, for example, the flow table, itself, does not need to be accessed. The flow table may reside in a dynamic random access memory (DRAM) module coupled to the network component, whereas the flow table cache typically resides in the network component, itself. If the flow is not stored in the flow table cache, which typically has a relatively small amount of high speed memory, compared with the memory storing the full flow table, the network component queries the full flow table for processing instructions. If a flow is not in the full flow table, the network component can query the larger computing device in which it is incorporated or a remote computing device to determine how packets associated with such flow should be processed. The network component can then add the results of the query to the flow table and/or flow table cache for processing future packets associated with the flow.

In some instances, the flows stored in the flow table can get stale over time if packets associated with a particular are not processed by the network component. Accordingly, entries in the flow table may benefit from being routinely cleared out to create room for new flows or to prompt a fresh query for flow processing instructions for a given flow. The process of determining if and when a flow table entry should be considered stale and therefore removed is known as flow table aging. Current systems for flow table aging in which flow tables are stored in DRAM often rely heavily on accessing the flow table DRAM which already has bandwidth limitations. Continuous accessing of the DRAM, can overwhelm these bandwidth limitations and lead to faults or unacceptable latencies. Therefore, there is a need for an improved method of managing flow entries in the flow table to alleviate bandwidth constraints between a network component and memory modules storing flow tables for such network components.

SUMMARY

At least one aspect is directed to a method of managing a flow table. The method includes providing a hardware memory module coupled to a network component. The hardware memory module stores a flow table including a plurality of entries. Each entry corresponds to a network flow. The method also includes providing on the network component a flow table age cache configured to store a set of recently active network flows. The method also includes providing on the network component a flow table management module configured to manage a duration for which respective entries in the flow table remain in the flow table.

In some implementations, upon the network component processing a data packet associated with a network flow, the flow table management module manages the duration for which respective entries in the flow table remain in the flow table by updating the flow table age cache with information indicating activity associated with the network flow, and periodically conducting a scan of the entries in the flow table.

In some implementations of the method, the scan includes, for each entry in the flow table, looking up the network flow associated with the entry in the flow table age cache. In response to the network flow associated with the entry being found in the flow table age cache, timer information for the network flow stored in the memory module is updated. In some implementations of the method, in response to the network flow associated with the entry not being found in the flow table age cache, the scan includes evaluating an age of the entry based on information stored in the hardware memory module and removing the entry from the flow table in response to the age of the entry exceeding a threshold time value associated with the network flow.

In some implementations, the flow table management module determines the age of each entry based on a status of the network flow associated with entry and respective age thresholds that correspond possible statuses of the network flow. In some implementations, the flow table management module is configured to evaluate the age of a flow entry by comparing a last active timer value stored for the flow entry to a timer value, and to scan the entries with a periodicity that is less than $$\frac{1}{2^{bit\ length\ of\ Last\ Active\ time}}$$

times the smallest age threshold associated with the possible statuses.

In some implementations, age information associated with each of the entries of the flow table is stored in the hardware memory module in a data structure that is separate from the flow table. In some implementations, the network component is a network interface card.

In some implementations, updating timer information for the network flow includes resetting an age timer for the network flow. In some implementations, updating the timer information for the network flow includes modifying a status of the network flow, thereby modifying the threshold time value associated with the network flow. In some implementations, the possible statuses for the network flows include transmission control protocol (TCP) flow statuses, including at least an initiation state, an established state, a terminating state, and a closed state. In some implementations, updating the flow table age cache with information indicating activity associated with the network flow includes changing the status of the network flow from a first of the possible statuses to a second of the possible statuses based on a type of the packet that was processed in association with the network flow.

In some implementations, the flow table management module is configured to maintain a multi-bit clock and to maintain for each flow entry in the flow table a last active time value represented by a same number of bits as are used in the multi-bit clock. In such implementations, evaluating the age of a flow table entry can comprise comparing the last active time for the entry in the hardware memory module against a current value of the multi-bit clock. In some implementations, if during the comparison, the last active time value stored for the flow table entry matches the bits of the multi-bit clock, the flow entry is determined to have exceeded the threshold.

At least one aspect is directed to a flow table management system. The system includes a hardware memory module configured to store a flow table including a plurality of network flow entries. The system also includes a network component communicatively coupled to the hardware memory module. The network component further includes a memory and a processor. The memory stores a flow table age cache configured to store a set of recently active network flows. The processor is configured to execute a flow table management module configured to manage a duration for which respective network flow entries in the flow table stored in the hardware memory module remain in the flow table.

The flow table management module manages the duration for which respective entries in the flow table remain in the flow table by, upon the network component processing a data packet associated with a network flow, updating the flow table age cache with information indicating activity associated with the network flow. The flow table management module is further configured to periodically conduct a scan of the network flow entries in the flow table. Periodically conducting the scan of the network flow entries in the flow table includes looking up the network flow associated with each entry in the flow table age cache. In some implementations, in response to the network flow being found in the flow table age cache, the flow table management module updates timer information for the network flow stored in the hardware memory module. In some implementations, in response to the network flow associated with an entry not being found in the flow table age cache, the method further includes evaluating an age of the entry based on information stored in the hardware memory module and removing the entry from the flow table in response to the age of the entry exceeding a threshold time value associated with the network flow.

In some implementations, the flow table management module is configured to determine the age of each entry based on a status of the network flow associated with entry and respective age thresholds that correspond possible statuses of the network flow. In some implementations, the flow table management module is configured to scan the entries with a periodicity that is less than one-fourth the minimum of the age thresholds associated with the possible statuses.

In some implementations, the age information associated with each of the entries of the flow table is stored in the hardware memory module in a data structure that is separate from the flow table.

In some implementations, updating timer information for the network flow comprises a resetting an age timer for the network flow. In some implementations, updating the timer information for the network flow comprises modifying a status of the network flow, thereby modifying the threshold time value associated with the network flow. In some implementations, the possible statuses for the network flows comprise TCP flow statuses, including at least an initiation state, an established state, a terminating state, and a closed state. In some implementations, updating the flow table age cache with information indicating activity associated with the network flow comprises changing the status of the network flow from a first of the possible statuses to a second of the possible statuses based on a type of the packet that was processed in association with the network flow.

In some implementations, the flow table management module is configured to maintain a multi-bit clock and to maintain for each flow entry in the flow table a last active time value represented by a same number of bits as are used in the multi-bit clock. In such implementations, evaluating the age of a flow table entry can comprise comparing the last active time for the entry in the hardware memory module against a current value of the multi-bit clock In some implementations, if during the comparison, the last active time value stored for the flow table entry matches the bits of the multi-bit clock, the flow entry is determined to have exceeded the threshold.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
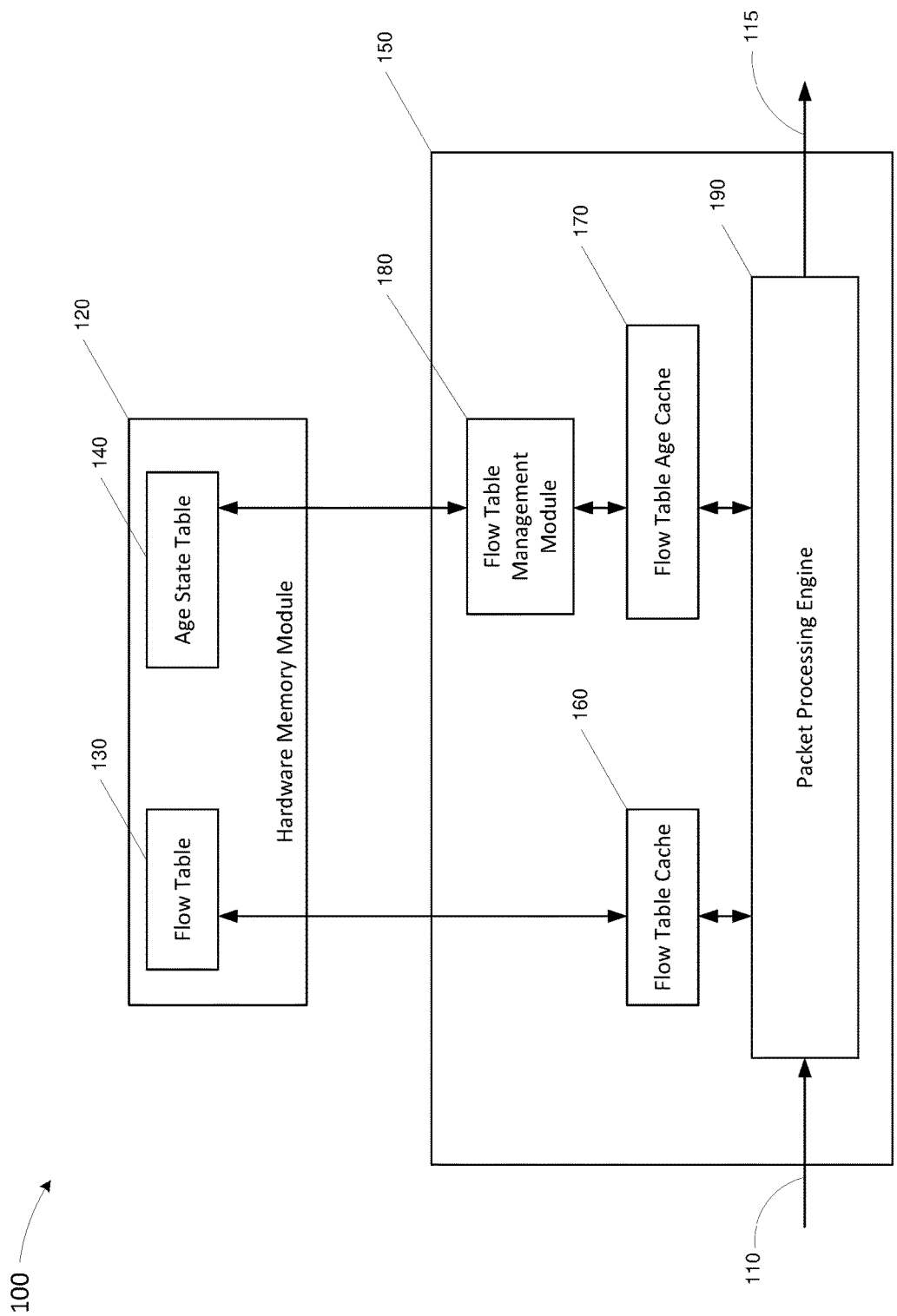
FIG. 1 is a block diagram illustrating various components of a flow table management system, according to an illustrative implementation.

The technologies described herein generally relate to a method of managing a flow table in a network component, such as a network interface card (NIC), a router, a switch, a server or any other network component. In various embodiments of the disclosed technologies, the management method is used in conjunction with a network component that is coupled to a memory module, such as, for example, a random access memory (RAM), static RAM (SRAM), dynamic RAM (DRAM), synchronous dynamic RAM (SDRAM), or double data rate RAM (DDR RAM), including DDR2 RAM, DDR3 RAM, DDR4 RAM, and low-power DDR (LPDDR), etc. As disclosed herein, in various embodiments, the hardware memory module stores a flow table including a plurality of entries, where each of the entries corresponds to a network flow. A flow table age cache on the network interface card is maintained and is configured to store a set of recently active network flows. A flow table management module on the network interface card manages a duration for which respective entries in the flow table remain in the flow table.

In operation, upon the network component processing a data packet associated with a network flow, the flow table management module updates the flow table age cache with information indicating the activity associated with the network flow. The network management module also conducts periodic scan of the entries in the flow table, comparing those entries to the entries in the flow table age cache. In response to the network flow associated with the entry being found in the flow table age cache during the scan, timer information for the network flow stored in the memory module is updated. The timer information can be stored directly in the flow table or in a separate age state table. Updating the timer information for the network flow may include resetting a timer associated with the flow or modifying a status of the network flow, thereby modifying the threshold time value associated with the network flow. The status of the flow can be modified based on a type of packet received with respect to the flow.

In response to the network flow associated with the entry not being found in the flow table age cache, the age of the entry is evaluated based on information stored in the hardware memory module. The entry is removed from the flow table if the age of the entry exceeds a threshold time value associated with the network flow. In some implementations, the flow table management module determines the age of each entry with reference to a status of the network flow associated with entry and respective age thresholds that correspond to possible statuses of the network flow. In some implementations, the flow statuses correspond to states of a flow in the TCP protocol or other stateful communication protocol. Example states include an initiation state, an established state, a terminating state, and a closed state. In some implementations, the flow table management module can be configured to scan the entries with a periodicity that is less than one-fourth the minimum of the age thresholds associated with the possible statuses.

In some implementations of the disclosed method, the flow table management module can be configured to maintain a multi-bit clock for use in evaluating the age of entries in the flow table. Evaluating the age of a flow table entry includes comparing timer information stored for the entry in the hardware memory module against a number of bits of the multi-bit clock. The number of bits used in the comparison can be based on the status of the network flow. In some implementations, if during the comparison, the values of the number of bits stored for the flow table entry matches the values of number of bits of the multi-bit clock associated with the flow status, the flow entry is determined to have exceeded the threshold.

FIG. 1 is a block diagram illustrating various components of a flow table management system 100, according to an illustrative implementation of the technologies as described herein. As shown in FIG. 1, the system 100 includes a (hardware) memory module 120 coupled to a network component 150. The memory module 120 stores a flow table 130 and an age state table 140. The network component 150 includes a flow table cache 160, an age cache 170, a flow table management module 180, and a packet processing engine 190 that is configured to receive an incoming data packet 110 and produce a processed data packet 115. In some implementations, the network component 150 can a network interface card (NIC) of a server. In some implementations, the network component 150 can be a router, a switch, a firewall, a network appliance, or any other network component.

The packet processing engine 190 is configured to be the primary processing engine of the network component 150. In various embodiments, the packet processing engine 190 can be configured to carry out packet forwarding operations, encryption or decryption operations, firewall functionality, network address translation, physical memory address translation, as well as other network functions known to those of ordinary skill in the art. The packet processing engine 190 can be an application specific integrated circuit (ASIC) or microprocessor programmed with computer executable instructions, in either case configured for efficient processing of network packets. In some implementations, the packet processing engine 190 may include multiple ASICs or microprocessors for executing different network functions or to process multiple packets in parallel.

When the incoming data packet 110 arrives, the packet processing engine 190 is configured to determine what network operations to carry out on the packet and with what parameters (if applicable). The determination is made based on the network flow to which the packet belongs. A network flow refers to a unique stream of data packets that make up a distinct communication stream between two end points. A flow is typically identified by a 5-tuple of information. For example, for TCP flows, the 5-tuple of information for a flow typically includes a source internet protocol (IP) address, source port number, destination IP address, destination port number, and a protocol identifier. For other types of flows, other header data fields can be used to define the 5-tuple. For example, for some protocols, instead of source and destination port numbers, the 5-tuple may include source and destination MAC addresses. To determine appropriate instructions for the packet, the packet processing engine queries the flow table cache 160 stored on the network component, or, if necessary, the flow table 130 stored in the memory module 120, as described further below.

In some implementations in which the network component 150 is a NIC, the memory module 120 may reside on the NIC 150 or on a common circuit board as the NIC. The memory module 120 and NIC are communicatively coupled via an interconnection bus.

In some implementations, the memory module 120 can include such as, for example, a random access memory (RAM), static RAM (SRAM), dynamic RAM (DRAM), synchronous dynamic RAM (SDRAM), or double data rate RAM (DDR RAM), including DDR2 RAM, DDR3 RAM, DDR4 RAM, low-power DDR (LPDDR), high-bandwidth memory (HBM), graphics double data rate (GDDR) memory, embedded DRAM (eDRAM), etc.

As shown on the left side of FIG. 1, the flow table cache 160 is communicatively coupled to the flow table 130 in the memory module 120. In some implementations, the packet processing engine 190 is configured to first look for processing instructions for a data packet 110 of a flow in the flow table cache 160, which serves as local cached version of portions of the full flow table 130. The look up can be based directly on the 5-tuple of information associated with the flow or based on a hash of the 5-tuple. If the flow is not located in the flow table cache, the packet processing engine can transmit a query to the flow table 130 in the memory module 120. If the flow is not located in either the flow table cache 160 or the flow table 130, the packet processing engine 190 can be configured to query another process or device, e.g., a network controller in the case of a router or server hypervisor in the case of a server, to identify processing instructions, which can then be saved in the flow table 130 and flow table cache 160.

Upon finding a hit in either the flow table 130 or flow table cache 160 or receiving instructions from an external process or device, the packet processing engine obtains instructions as to how to process the data packet 110. For example, the entry for the flow may indicate that the data packet should be processed by any of the network functions implemented by the packet processing engine 190. For example, in implementations in which the NIC 150 is part of a network router or a switch, a flow table entry may merely indicate which port to forward the packet over. For certain types of routers, e.g., gateway routers, the flow table entry may include more complex instructions, including firewall processing, network address translation, or execution of other network functions. For NICs incorporated into servers, a flow table entry may indicate that the packet processing engine should carry out decryption or physical memory address translation to direct the packet to a particular virtual machine or container executing on the server. The packet processing engine 190 then executes the instructions indicated in the information retrieved from the flow table cache 160 or flow table 130.

As shown in FIG. 1, the flow table 130 and the age state table 140 are separate data structures. This implementation may provide independent access of each data structure for handling queries to the flow table and for flow table aging processes executed by the flow table management module 180 for analysis, as described further below. In some implementations, the flow table 130 and the age state table 140 can be combined into a single data structure. This implementation with the single data structure for the combined flow table 130 and age state table 140 may require more bandwidth for handling flow table entry aging each aging query may result in the return of substantially more data than the querying of a separate age state table. Specifically, when information is collected from the age state table 140 back to the flow table management module 180 for analysis, to reduce processing requirements, contiguous blocks of memory are typically retrieved, thereby avoiding the processing needed to parse portions of the memory. A combined flow table/age state table would therefore result in the transmission of a same number of larger blocks of data, or more transmissions of data, with each transmission including information about fewer flow table entries. As a flow table may include as many as 16 million entries, or more, it is valuable to keep the number and size of transmissions to a minimum to reduce bandwidth, reduce energy consumption, and improve execution speed. Maintaining an independent flow table 130 and age state table 140 can help achieve these goals.

As shown on right side of FIG. 1, the flow table management module 180 is communicatively coupled to the age cache 170 and to the age state table 140 in the memory module 120. In some implementations, the flow table management module 180 and flow table cache 170 may be connected to a common interconnection bus as the memory module 120 storing the age state table 140. In some implementations, the flow table management module 180 executes on the same processor as the packet processing engine 190. In other implementations, the flow table management module 180 can execute on a dedicated processor. Further details are provided below with respect to FIGS. 2 and 3.

Figure 2:
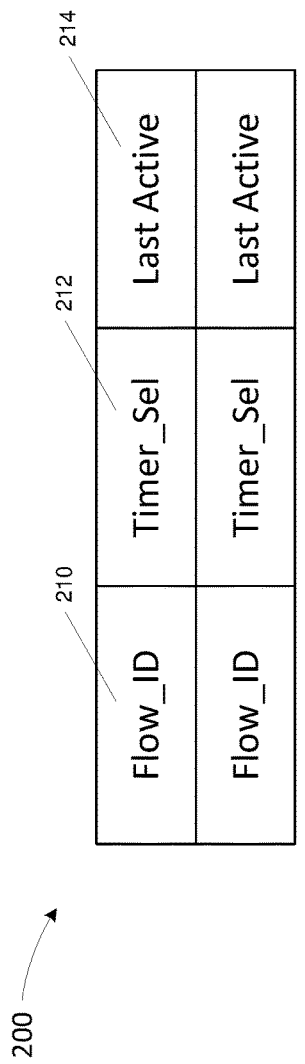
FIG. 2 shows an example of an age state table, according to an illustrative implementation.

FIG. 2 shows an example of an age state table 200, according to an illustrative implementation. As shown in FIG. 2, the age state table 200 includes series of entries 208. For each entry, the age state table stores a flow ID 210, a timer select 212, and a last active value 214. The flow ID 210 is an identifier of a flow. In some implementations, the flow ID 210 can be a number, a 5-tuple of data associated with a flow, or a hash value, e.g., a hash of the 5-tuple. Preferably, the age state table 200 has the same number of entries as the flow table 130 shown in FIG. 1, as the age state table 200 is configure to track the age of each flow listed in the flow table 130. In some implementations, the timer select 212 can be a value selected to identify which timing or age threshold is to be applied in evaluating whether a corresponding entry in the flow table is stale and should be removed. In some implementations, the last active value 214 is a value which indicates when it was last determined that a particular flow ID 210 was active. For example, the last active value 214 indicates when the last time the NIC 150 processed a data packet associated with the particular flow ID 210. The last active value may be a value indicating an actual clock time of when a most recent packet associated with the flow was received, or it may be a timer value associated with the last time a scan of the flow table age cache 170 indicated there was recent activity associated with the flow.

In some implementations, the age state table 200 can include an additional "static" flag (not shown). If the static flag is set for a given entry, the entry will not be aged out, regardless of its status or age.

In some implementations, the age state table 200 may forgo an explicit flow id 210 data field. Instead, each row of the age state table 200 may be logically linked to a given row of the flow table so that the nth row of the age state table 200 is understood by the system to always correspond to the flow stored in the nth row of the flow table 130.

Figure 3:
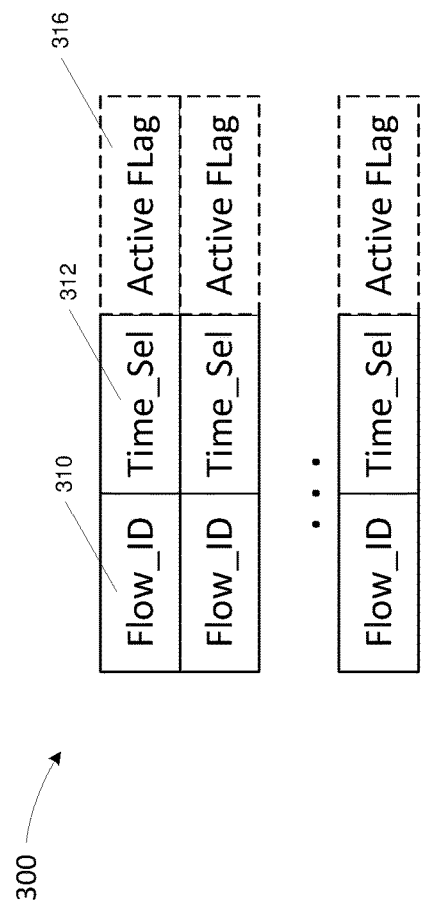
FIG. 3 shows an example of a flow table age cache, according to an illustrative implementation.

FIG. 3 shows an example of a flow table age cache 300, according to an illustrative implementation. As shown in FIG. 3, the flow table age cache 300 includes a plurality of entries 308. For each entry, the flow table age cache stores a corresponding flow ID 310, a timer select 312, and optionally an active flag 316. The flow ID 310 is an identifier of a flow, which, as with the flow ID 210 can be a number, a 5 tuple of information, or a hash value, for example of the 5 tuple of information. In some implementations, the age state table 140, flow table age cache 170, flow table cache 160, and flow table 130 may identify flows with a larger or smaller tuple of data fields, such as a 4 tuple, 6 tuple, etc., without departing from the scope of this disclosure. In some implementations the flow ID 310 is a number or pointer that serves as an index into both the age state table 140 and the flow table 130. The timer select 312 identifies what timing threshold or age threshold should apply to the flow associated with the corresponding flow ID 310. In some implementations, the active flag 316 is a binary value, which can be either 0 or 1. For example, the packet processing engine 190 can set the active flag 316 for a flow to 1 upon receiving a packet associated with the flow, and the flow table management module 180 can set the active flag to 0 after updating the age state table 140 to indicate recent activity in the flow. If the flow table age cache is filled 170, entries with an active flag value of 0 can be overwritten. If no entries have an active flag value of 0, the flow table age cache can immediately be flushed to the age state table, thereby setting all active flag values back to 0, providing new room to add flows to the flow table age cache 170. Alternatively, the packet processing engine can merely just add an entry to the flow table age cache 170 upon processing a packet associated with a given flow, if no entry associated with the flow is already present in the flow table age cache 170. The flow table management module 180 can delete the entry associated with a flow after updating the age state table 140 with an indication of recent use. If the flow table age cache 170 is full when the packet processing engine 190 attempts to add a new flow to the flow table age cache 170, the age state table can be immediately updated based on the current state of the flow table age cache 170 and the flow table age cache 170 can be flushed.

Figure 4:
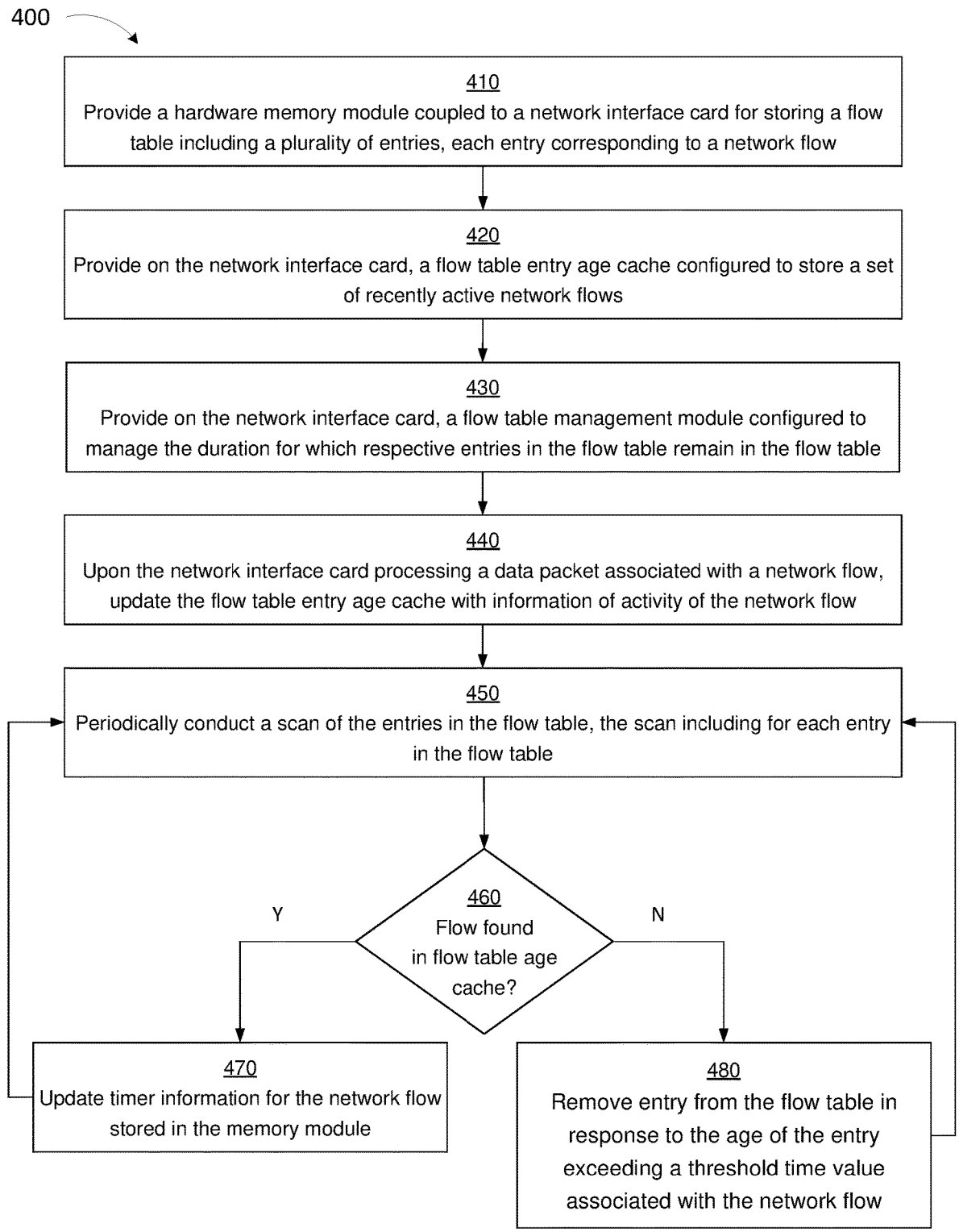
FIG. 4 is a flowchart for a method of managing a flow table, according to an illustrative implementation.

FIG. 4 is a flowchart for a method 400 of managing a flow table, according to an illustrative implementation. The method 400 can be carried out, e.g., by the flow table management module 180 shown in FIG. 1, using an age state table 140 and flow table age cache 170. The method includes providing a hardware memory module coupled to a network interface card. The hardware memory module stores a flow table including a plurality of entries, each entry corresponding to a network flow (step 410). The flow table can include a separate flow table and age state table (e.g., the age state table 200 shown in FIG. 2) as shown in FIG. 1, or a combined flow table/age state table. The method 400 also includes providing on the network interface card, a flow table age cache, such as the flow table age cache 170 shown in FIG. 1 or the flow table age cache 300 shown in FIG. 3 (step 420). The flow table age cache is configured to store a set of recently active network flows. The method 400 also includes providing on the network interface card, a flow table management module, such as the flow table management module 180, configured to manage the duration for which respective entries in the flow table remain in the flow table (step 430).

Upon the network interface card processing a data packet associated with a network flow, the method 400 includes updating the flow table age cache with information indicating activity associated with the network flow (step 440). The flow table age cache can be updated by adding an entry associated with the network flow if it is not already present in the flow table age cache, or by setting an active flag associated with the flow to a value indicative of recent activity (e.g., a value of 1). In addition, depending the type of packet received with respect to the packet, the timer select value associated with the flow may be updated. For example, upon receipt of a TCP SYN,ACK packet, the status of the flow may be transitioned from a SYN Sent state to an Established state. Upon receipt of a TCP FIN packet, the flow state may transition from an Established state to a Close_Wait state. The packet processing engine may be configured to set the timer select value in the flow table age cache selected to correspond to the new state. It would be appreciated by one of ordinary skill in the art that certain TCP flow states are more transient than others. Accordingly, shorter timers can be set for flows in more transient states than flows in more persistent states.

The method 400 also includes periodically conducting a scan of the entries in the flow table against the entries in the flow table age cache (step 450). The scan can be conducted by the flow table management module retrieving blocks of entries from the age state table stored in the memory module and looking up each retrieved entry in the flow table age cache. In response to the network flow associated with the entry being found in the flow table age cache (decision block 460), the method 400 further includes updating timer information for the network flow stored in the memory module (step 470). For example, the flow table management module may store in the age state table 140 the current state of the flow and the time the scan was conducted. In response to the network flow associated with the entry not being found in the flow table age cache (decision block 460), the method 400 includes evaluating an age of the entry based on information stored in the hardware memory module and removing the entry from the flow table in response to the age of the entry exceeding a threshold time value associated with the network flow (step 480). The flow table entry can be removed by the flow table management module 180 clearing the entry in the flow table, or marking the flow table entry as stale, allowing it to be written over if a new flow is added, or causing it to be refreshed if a new packet for that flow is received prior to it being rewritten.

In some implementations of the method 400, the flow table management module is configured to repeat the scanning process (steps 450-480) with a periodicity that is less than or equal to one-fourth the minimum of the age thresholds associated with the possible statuses. In some implementations, the scanning frequency is tied to the number of bits used in age comparison. Accordingly, in some implementations, the scanning frequency can be $$\frac{1}{2^{length\ of\ Last\ Active\ field}} *$$

smallest age threshold.

In some implementations of the method 400, the flow table management module is configured to track the age of flow table entries by maintaining a multi-bit clock timer, which is periodically incremented. In some implementations, the timer is incremented each time a scan is completed. In other implementations, the time is incremented periodically based on the passage of a predetermined amount of time (e.g., one or more microseconds, seconds, minutes, etc.). In other implementations, the flow management module maintains multiple timers, each associated with a different timer select value. For example, a first timer may be incremented every x microseconds, a second timer may be incremented every y seconds, a third timer may be incremented every z minutes, and so forth, depending on how many timer select values the flow management module supports. In implementations in which multiple timers are maintained, evaluating the age of a flow table entry at stage 480 includes comparing timer information stored for the flow entry in the hardware memory module against the bits of the timer corresponding to the timer select value associated with the flow. In some implementations with a single timer, the age of a flow table entry can be evaluated by comparing timer information stored for the flow entry in the hardware memory module against a certain number of bits (as indicated by the timer select value associated with the flow) of the timer. In some other implementations utilizing a single timer, the timer value may first be converted to a value in the time scale associated with the timer select value for the flow, and the converted time value is then compared against the timer information stored for the flow in the hardware memory module. In such implementations, the number of bits used in the comparison, the timer used in the comparison, or the time scale used for the comparison (as applicable) can be based on the status of the network flow. In some implementations of the method 400, if during the comparison, the timer value stored for the flow table entry matches the applicable timer value, the flow entry is determined to have exceeded the age threshold. An example of this comparison process is described below.

Figures 5A, 5B:
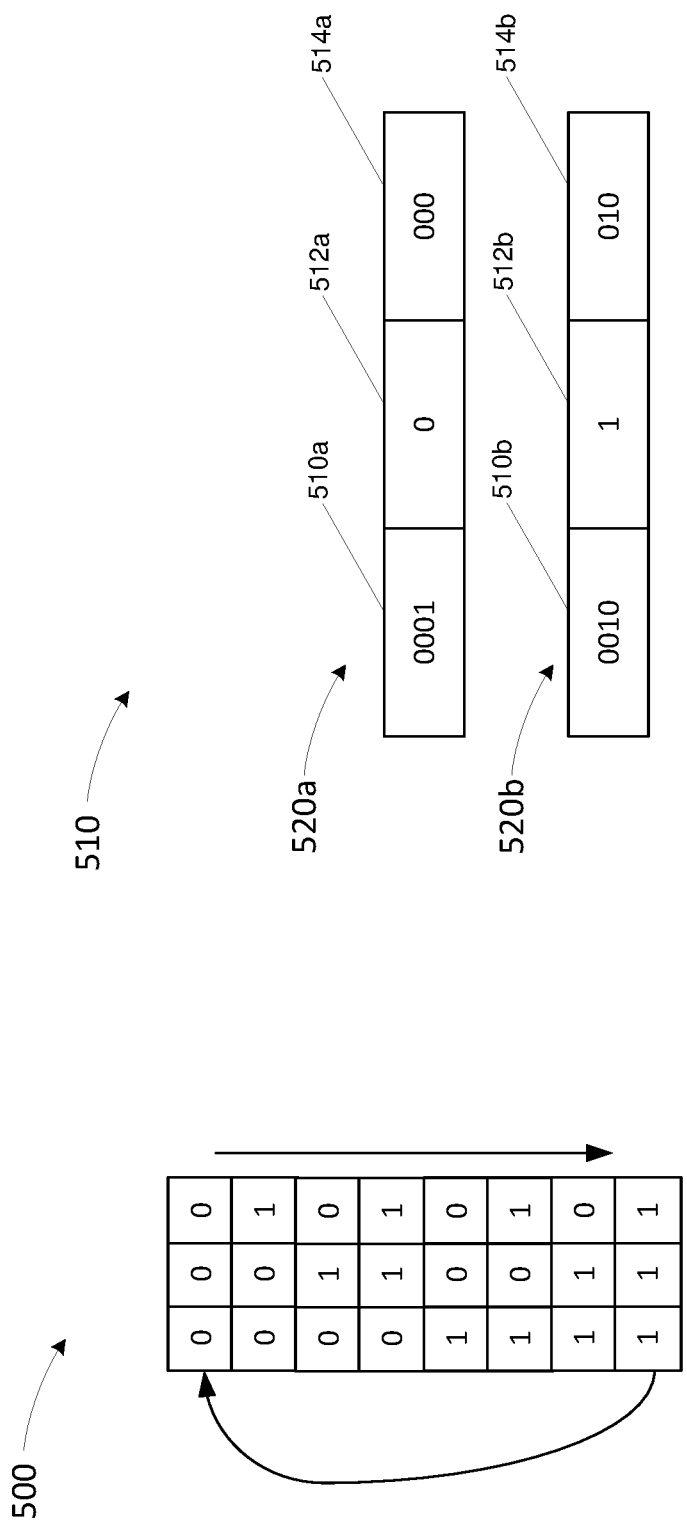
FIG. 5A shows an example of a flow table timer, according to an illustrative implementation.
FIG. 5B shows an example of an age state table that uses the flow table timer of FIG. 5A.

FIG. 5A shows an example of a flow table timer 500, according to an illustrative implementation suitable for use in the above-mentioned timer scheme. As shown in FIG. 5, the timer 500 is a three-bit long timer shown in a table with 8 possible time ticks in rows that go from 0-0-0 at the top row, 0-0-1 at the second row, 0-1-0 at the third row, . . . to 1-1-1 at the bottom row, then repeats again from 0-0-0 at the top row. In some implementations, the timer 500 is incremented each time a scan of the age state table 140 is completed. During a scan, if a flow entry in the age state table 140 is found in the flow table age cache, the last active value 214 for that entry is updated to the current value of the timer. The timer 500 can then be used to determine the age of a particular flow ID by comparing the last active value 214 associated with the flow to the then current timer value.

FIG. 5B shows an example of an age state table 510 that uses the flow table timer 500. As shown in FIG. 5B, the age state table 510 includes two flow entries, entries 520*a* and 520*b*. The age state table entry 520*a* includes a flow ID 510*a*, a timer select 512*a* and a last active value 514*a*. Similarly, the age state table entry 520*b* shows a flow ID 510*b*, a timer select 512*b* and a last active value 514*b*. As shown in FIG. 5B, entry 520*a* has a timer select value 512*a* of 0, and has a last active value 514*a* of 0-0-0. Entry 520*b* has a timer select value 512*b* of 1 and a last active value 514*b* of 0-1-0. In some implementations, a timer select value of 0 can indicate that the aforementioned comparison should take into account the two least significant bits of the timer counter 500, whereas a timer select value of 1 indicates the comparison should take into account all three bits of the timer counter 500.

Accordingly, for entry 520*a*, with a timer select value of 0, assuming no new packets are received for that flow, the flow table management module 180 will consider the entry 520*a* to have aged out during the next scan in which the last two bits of the timer counter 500 matches the last two bits of the last active value 514*a*, in this case 0-0. As seen in FIG. 5A, the last two digits of the timer 500 are 0-0 every four counter values. Accordingly, the entry 520*a* will be aged out of the flow table after four scans of the age state table have been completed without a new packet being process for that flow. In contrast, since the timer select value for entry 520*b* is 1, indicating that all three bits of the last active value 514*b* should be used in the comparison, based on FIG. 5, it is evident that all three bits of the last active value will match the timer value once every 8 counter values. Accordingly, a flow with a timer select value of 1 can remain in the flow table without any activity for twice as long as a flow that has a timer select value of 0 in its corresponding entry in the age state table 140.

While the discussion of FIGS. 5A and 5B suggest a three bit timer, it would be evident that a timer employing additional bits could allow for additional timer select values and different aging thresholds. For example, by adding a fourth bit to the timer and a third possible timer select value that requires four bits of the last active value to match the last four bits of the timer value, a third timing threshold could be added. This third timing threshold would be twice the second timing threshold (with a timer select value of 1) and four times the first timing threshold (with a timer select value of 0). The addition of a fifth bit to the timer would enable yet an additional, longer threshold, and so forth.

While the aforementioned timer architecture provides one processor and memory efficient manner of tracking age in a flow table, the systems disclosed herein can use other timing mechanisms. For example, the last active value can be a CPU or other processor clock identifying the specific time the last packet associated with the flow was received by the NIC. The timer select value may be an actual value indicating the amount of time (in terms of CPU clock cycles) that may pass without activity before an entry ages out. In such implementations, the comparison conducted at stage 480 can be a comparison of the difference between the current clock time and the stored clock time relative to the threshold time indicated by the timer select value. In still another implementation, the timer select value may be an index into an age threshold data structure that stores correspondences between timer select values and actual aging thresholds.

As indicated above, in some implementations, the flow table management module may maintain multiple equal width clocks, (i.e., each clock uses the same number of bits to track time) with each clock corresponding to a different time scale. For example, a first clock may track time in microseconds, a second clock may track time in milliseconds, a third clock may track time in seconds, and a fourth clock may track time in minutes. Each clock may track time in increments of individual time units or block of time units. For example, one microsecond clock may be incremented every 1, 5, 10, or 25 or any other number of microseconds. In some implementations, a second microsecond clock may track time increments of a different number of microseconds. The time increments used for each timer are selected based on the maximum time threshold desired to be tracked by the timer, and the number of bits (corresponding to degree of precision) desired to track such time. For example, for an age threshold of 100 microseconds tracked with a two bit timer, the timer can be incremented every 25 microseconds. If a three bit timer were used, the timer would be incremented every 12.5 microseconds, etc. The last active time value stored in the age state table is represented by the same number of bits used for the timers. To evaluate whether a given flow should be aged out, the flow table management module can identify the appropriate timer as indicated by the timer select value stored for the flow and compare the value stored in the timer to the current value of the indicated timer. If the values match, it is determined that the flow has exceeded the age threshold.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of managing a flow table, comprising:
   providing a hardware memory module coupled to a network component, the hardware memory module storing a flow table including a plurality of entries, each entry corresponding to a network flow;
   providing on the network component, a flow table age cache configured to store a set of recently active network flows;
   providing on the network component, a flow table management module configured to manage a duration for which respective entries in the flow table remain in the flow table by:
      upon the network component processing a data packet associated with a network flow, updating the flow table age cache with information indicating activity associated with the network flow;
      periodically conducting a scan of the entries in the flow table, the scan including for each entry in the flow table:
         looking up the network flow associated with the entry in the flow table age cache;
         in response to the network flow associated with the entry being found in the flow table age cache, updating timer information for the network flow stored in the memory module; and
         in response to the network flow associated with the entry not being found in the flow table age cache, evaluating an age of the entry based on information stored in the hardware memory module and removing the entry from the flow table in response to the age of the entry exceeding a threshold time value associated with the network flow,
      wherein updating the timer information for the network flow comprises modifying a status of the network flow, thereby modifying the threshold time value associated with the network flow.

2. The method of claim 1, wherein the flow table management module evaluates the age of each entry based on a status of the network flow associated with entry and respective age thresholds that correspond to possible statuses of the network flow.

3. The method of claim 2, wherein the flow table management module is configured to evaluate the age of a flow entry by comparing a last active timer value stored in association to a timer, and to scan the entries with a periodicity that is less than $$\frac{1}{2^{bit\ length\ of\ Last\ Active\ time}}$$

times the smallest age threshold associated with the possible statuses.

4. The method of claim 1, wherein age information associated with each of the entries of the flow table is stored in the hardware memory module in a data structure that is separate from the flow table.

5. The method of claim 1, wherein the network component comprises a network interface card of a server.

6. The method of claim 1, wherein the possible statuses for the network flows comprise TCP flow statuses, including at least an initiation state, an established state, a terminating state, and a closed state.

7. The method of claim 1, wherein updating the flow table age cache with information indicating activity associated with the network flow comprises changing the status of the network flow from a first of the possible statuses to a second of the possible statuses based on a type of the packet that was processed in association with the network flow.

8. The method of claim 1, wherein the flow table management module is configured to maintain a multi-bit clock and to maintain for each flow entry in the flow table a last active time value represented by a same number of bits as are used in the multi-bit clock, and wherein evaluating the age of a flow table entry comprises comparing the last active time for the entry in the hardware memory module against a current value of the multi-bit clock.

9. The method of claim 8, wherein if during the comparison, the last active time value stored for the flow table entry matches the bits of the multi-bit clock, the flow entry is determined to have exceeded the threshold.

10. A flow table management system, comprising:
a hardware memory module configured to store a flow table including a plurality of network flow entries;
a network component communicatively coupled to the hardware memory module, the network component further comprising:
a memory storing a flow table age cache configured to store a set of recently active network flows;
a processor configured to execute a flow table management module, the flow table management module configured to manage a duration for which respective network flow entries in the flow table stored in the hardware memory module remain in the flow table by:
upon the network component processing a data packet associated with a network flow, updating the flow table age cache with information indicating activity associated with the network flow;
periodically conducting a scan of the network flow entries in the flow table, the scan including for each entry in the flow table:
looking up the network flow associated with the entry in the flow table age cache;
in response to the network flow associated with the entry being found in the flow table age cache, updating timer information for the network flow stored in the memory module; and
in response to the network flow associated with the entry not being found in the flow table age cache, evaluating an age of the entry based on information stored in the hardware memory module and removing the entry from the flow table in response to the age of the entry exceeding a threshold time value associated with the network flow,
wherein updating the timer information for the network flow comprises modifying a status of the network flow, thereby modifying the threshold time value associated with the network flow.

11. The system of claim 10, wherein the flow table management module is configured to determine the age of each entry based on a status of the network flow associated with entry and respective age thresholds that correspond possible statuses of the network flow.

12. The system of claim 11, wherein the flow table management module is configured to evaluate the age of a flow entry by comparing a last active timer value stored for the flow entry to a timer, and to scan the entries with a periodicity that is less than $$\frac{1}{2^{bit\ length\ of\ Last\ Active\ time}}$$

times the smallest age threshold associated with the possible statuses.

13. The system of claim 10, wherein age information associated with each of the entries of the flow table is stored in the hardware memory module in a data structure that is separate from the flow table.

14. The system of claim 10, wherein the possible statuses for the network flows comprise TCP flow statuses, including at least an initiation state, an established state, a terminating state, and a closed state.

15. The system of claim 10, wherein updating the flow table age cache with information indicating activity associated with the network flow comprises changing the status of the network flow from a first of the possible statuses to a second of the possible statuses based on a type of the packet that was processed in association with the network flow.

16. The system of claim 10, wherein the flow table management module is configured to maintain a multi-bit clock and to maintain for each flow entry in the flow table a last active time value represented by a same number of bits as are used in the multi-bit clock, and wherein evaluating the age of a flow table entry comprises comparing the last active time for the entry in the hardware memory module against a current value of the multi-bit clock.

17. The system of claim 16, wherein if during the comparison, the last active time value stored for the flow table entry matches the bits of the multi-bit clock, the flow entry is determined to have exceeded the threshold.

18. The system of claim 10, wherein the network component comprises a network interface card.

* * * * *